Aug. 27, 1929.   R. S. BLAIR   1,726,467
EYEGLASS CONSTRUCTION
Filed Feb. 15, 1924
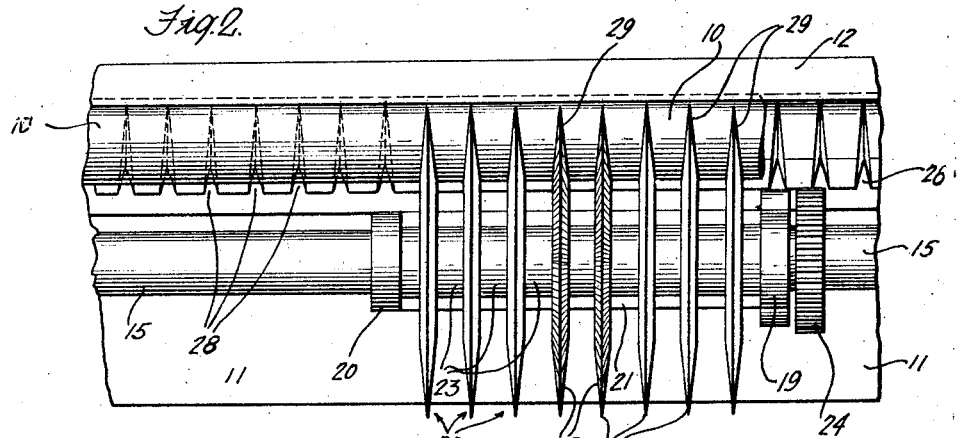
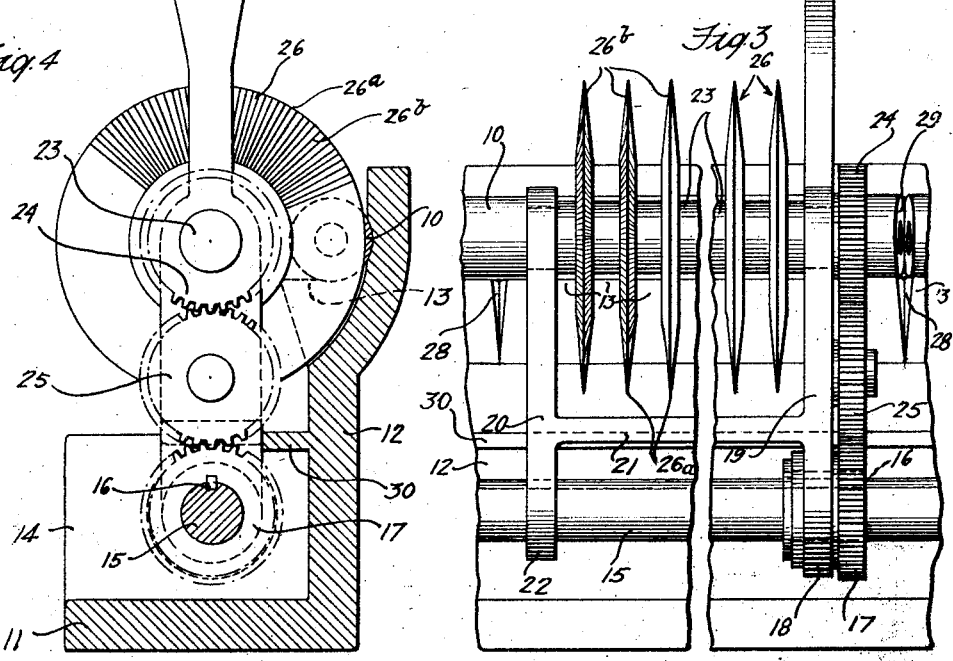
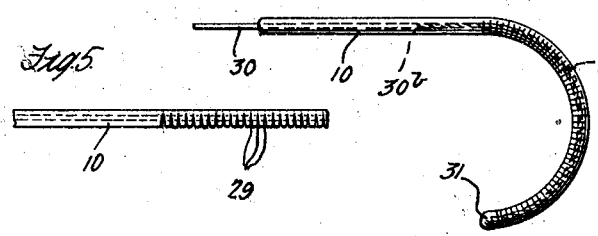
INVENTOR Patented Aug. 27, 1929.

1,726,467

UNITED STATES PATENT OFFICE.

ROBERT S. BLAIR, OF STAMFORD, CONNECTICUT, ASSIGNOR TO BAY STATE OPTICAL COMPANY, OF ATTLEBORO, MASSACHUSETTS, A CORPORATION OF MAINE.

EYEGLASS CONSTRUCTION.

Application filed February 15, 1924. Serial No. 693,004.

This invention relates to eyeglass construction and with regard to its more specific features to the construction of eyeglass temple bars.

One of the objects of the invention is to provide a construction of the above nature practical and efficient and capable of meeting the requirements of use in a highly satisfactory manner. Another object is to provide a construction of the above nature strong and dependable, adapted for long wear. Another object is to provide such a construction neat in appearance and conducive in a high degree to the convenience and comfort of the wearer. Another object is to provide a practical and efficient art whereby temple bars of the above nature may be conveniently constructed at low cost. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing in which is shown one of the various possible embodiments of the several mechanical features of this invention:

Figure 1 shows, on an enlarged scale, a portion of an eyeglass temple bar member at an early stage in its process of manufacture.

Figure 2 is a plan view, partly cut away, of an apparatus for operating upon the member shown in Figure 1.

Figure 3 is a front elevation, partly cut away, of the apparatus shown in Figure 2.

Figure 4 is a transverse sectional view of the apparatus of Figures 2 and 3.

Figure 5 shows, on a smaller scale, a portion of the temple bar member after leaving the above apparatus, and, Figure 6 shows the rear portion of a completed temple bar.

Similar reference characters refer to similar parts throughout the several views of the drawing.

Referring now to the drawing in detail, Figure 1 shows, on an enlaged scale, a portion of a tubular member 10 adapted to form a part of an eyeglass temple bar. This tubular member 10 is of celluloid and may be formed, as shown in Figure 1, in any desired manner. It may be here noted that the term celluloid as employed herein is to be interpreted broadly throughout to comprehend various non-metallic substances of the general nature of celluloid and adapted for use in the manufacture of eyeglass frames and associated parts. The tube 10 is preferably first cut to substantially the length which it is to have in the completed temple bar of which it is to form a part and is then operated upon as will now be described.

Referring now to Figures 2, 3 and 4, there is shown a supporting base 11 from the rear side of which projects an upwardly extending supporting plate or wall 12. This supporting plate 12 extends longitudinally of the base 11 and is provided with a ledge 13 which is of sufficient length to accommodate the celluloid tube 10. The celluloid tube 10 is supported upon this ledge 13 and clamped securely in position thereon by any suitable means.

Journaled in suitable end walls 14 of the base 11, as shown in Figure 4, is a shaft 15 which is adapted to be rotated by any suitable source of power. The shaft 15 is splined as indicated at 16 and driven through this spline is a gear 17 which is slidable lengthwise of the shaft. This gear 17 is journaled at 18 in a frame which preferably comprises two vertical arms 19 and 20 and a lateral connecting arm 21, the frame being loosely carried by the shaft 15 at 18 and 22. This frame therefore is movable longitudinally of the apparatus along the shaft 15 and carries the gear 17 therewith, the gear 17 being continually in driving relation with the shaft 15 through the spline 16.

Journaled in the upper portions of the arms 19 and 20 of the movable frame is a shaft 23. Secured to the shaft 23 is a gear 24 which is driven from the gear 17 through an idler gear 25 also carried by the frame arm 19. The axis of the shaft 23, as shown in Figure 4, is parallel with the axis of the celluloid tube 10 and in the position shown in Figure 4 is preferably in substantially the same horizontal plane as is the axis of the celluloid tube. The shaft 23 carries a plurality of cutters 26 which operate upon the celluloid tube 10 as will be described. The frame comprising the arms 19 and 20 may be swung about the axis of the shaft 15 to feed the cutters toward or away from the tube 10 and a handle 27 is preferably provided to facilitate this operation. The gears 17, 25 and 24 are continually in mesh driving the cutters 26 from the shaft 15. The cutters may also be moved longitudinally relative to the tube 10 by sliding the supporting frame along the shaft 15.

The cutters 26 take the form of circular disks and at their peripheries 26$^a$ are preferably narrowed to substantially a knife-edge. From their peripheries the sides 26$^b$ of each gradually diverge toward the hub and are provided with radial cutting teeth as shown in Figure 4. As shown in Figures 2 and 3 the ledge 13 supporting the celluloid tube 10 is provided with regularly spaced tapered slots 28 adapted to serve as guides for the cutting tools. As the rotating tools are moved toward the celluloid tube and to the position indicated in Figure 4, each of the cutters cuts a slot or recess 29 in the celluloid. Preferably a suitable stop, which is indicated at 32, is provided which prevents inward movement of the cutters beyond the position shown in Figure 4. The slots are therefore cut from one side of the tube through the axis of the tube and part way through the opposite wall leaving preferably a small solid portion. It will be seen that the slots 29 due to the shape of the cutters are formed with walls which diverge outwardly toward the side of the tube where the cut is commenced. The portions of celluloid which are removed by the cutters to form the slots 29 are substantially crescent-shaped. Furthermore, as viewed in Figure 2, the portion of the tube on one side of a plane coaxial with the tube and vertical with respect to the drawing, is provided with slots the walls of which diverge outwardly away from the axis, while the portion of the tube on the other side of this plane is, in effect, provided with slots which diverge inwardly toward the axis.

The celluloid tube is slotted as above described along that portion thereof which is to form the curved portion or ear piece of the temple bar, the frame carrying the cutters being moved along longitudinally of the tube as required. A portion of the tube 10, after the cutting operation thereon, is shown on a smaller scale in Figure 5. In Figure 6 the slotted celluloid tube is shown upon a metallic temple bar member or core 30 forming the completed temple bar. The member 30, it will be understood, extends forwardly and is joined to an eyeglass frame or other lens mounting in the usual manner and its rear portion is curved to the contour of an ear piece. This curved portion indicated at 30$^a$ is preferably flexible being formed, for example, from a spirally wound wire member whereby the desired degree of flexibility is attained. This flexible coiled portion 30$^a$ of the member 30 may comprise that portion rearwardly of a point 30$^b$, for example. The extreme rear end of the metallic member 30 is preferably threaded and threaded thereon is a celluloid cap 31 which thus forms a smooth rounded end for the ear pieces.

The celluloid tube is placed upon the metallic member 30 so that the slotted side thereof is positioned on the inner side of the curve of the curved ear piece. The slots 29 thereupon close up as indicated in Figure 6 leaving a smooth even surface. The curved ear piece is thus provided with a celluloid covering which is flexible being readily flexed with the metallic core and which has throughout a substantially smooth solid surface. In bringing about the desired flexibility of the celluloid tube at the curved portion, there are occasioned no gaps or crevices to catch dirt and entangle with the hair. Furthermore, the construction is one which is strong and durable capable of affording dependable service.

From the above it will be seen that there are herein provided a temple bar construction and art of producing the same which embody the features of this invention and attain many useful and practical advantages.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. In construction for eyeglass temple bars and the like, a curved member having formed in its surface a plurality of spaced recesses extending thereinto beyond the center of the member the walls of said recesses diverging toward the inner side of the curve.

2. In construction for eyeglass temple bars and the like, a curved member having formed in its surface on the inside of the curve a plurality of substantially transverse slots diverging outwardly and extending thereinto beyond the center line of the member.

3. In construction for eyeglass temple bars and the like, a curved member having a plurality of spaced slots cut from the inner curved surface thereof and extending thereinto a major portion of the distance to the opposite outer curved surface.

4. In construction for eyeglass temple bars and the like, in combination, a tubular member of celluloid having a plurality of substantially transverse slots formed therein along one side thereof leaving the opposite side uncut and a curved core member about which said tubular member is placed with said slots on the inside whereby flexibility is attained without interstices in the surface of the tube.

5. In construction for eyeglass temple bars and the like, a tubular member of celluloid having a plurality of substantially crescent-shaped portions removed therefrom.

6. In construction for eyeglass temple bars and the like, a tubular member of celluloid having its walls slotted at spaced portions, said slots extending substantially transversely and about a major portion of the circumference of said tube.

7. In construction for eyeglass temple bars and the like, a tubular member of celluloid having formed in its wall on one side of an axial plane substantially transverse slots diverging outwardly from the axis and in its wall on the other side of said axial plane substantially transverse slots diverging inwardly toward said axis.

8. In construction for eyeglass temple bars and the like, a tubular member of celluloid having formed in its wall on one side of its axis a plurality of spaced slots with outwardly diverging walls.

9. In construction for eyeglass temble bars and the like, a tubular member of celluloid having formed in its wall on one side of its axis a plurality of spaced slots with outwardly diverging walls, said slots extending into the opposite wall on the opposite side of said axis.

10. In construction for eyeglass temple bars and the like, a curved tubular member of celluloid having portions of the material thereof removed from its wall on the inner side of the curve and leaving openings extending through the wall.

11. In construction for eyeglass temple bars and the like, a curved tubular member of celluloid having formed in its wall on the inner side of the curve a plurality of spaced slots the walls of which diverge toward the surface.

12. In construction for eyeglass temple bars and the like, a curved tubular member of celluloid having formed therein a plurality of slots extending through the wall thereof forming the inner side of the curve and into the opposite wall forming the outer side of the curve.

13. In construction for eyeglass temple bars and the like, in combination, a curved inner core member of metal, and an outer covering thereon comprising a celluloid tube having a continuous outer wall on the outer side of the curve and having portions of the material thereof removed at spaced points along the inner side of the curve.

14. In construction for eyeglass temple bars and the like, in combination, a curved inner core member of metal, and an outer covering thereon comprising a celluloid tube having crescent-shaped portions of the material thereof removed at intervals along the inner side of the curve.

15. In construction for eyeglass temple bars and the like, in combination, a curved inner core member of metal, and an outer covering thereon comprising a celluloid tube having slots with diverging walls cut from the inner side of the curve through a major portion of the distance through the same to the outer side of said curve.

16. The herein described art of making temple bars for eyeglasses which consists in forming a tubular member of celluloid and transversely slotting said tube at spaced points along one side thereof leaving the opposite side unslotted.

17. The herein described art of making temple bars for eyeglasses which consists in forming a tubular member of celluloid and removing portions of the material thereof at spaced points along one side to form therein a plurality of substantially transverse spaced slots having outwardly diverging walls and curving said tube into the shape of an ear-piece with said slots on the inner side of the curve.

18. The herein described art of making temple bars for eyeglasses which consists in forming a tubular member of celluloid, transversely slotting said tube at spaced points along one side thereof leaving the opposite side unslotted, and curving said tubular member to the shape of an ear piece with said slotted side on the inner side of the curve whereby there is provided a flexible tube without interstices in its surface.

19. The herein described art of making temple bars for eyeglasses which consists in forming a tubular member of celluloid, transversely slotting said tube at spaced points along one side thereof with the sides of the slots diverging toward their open end and leaving the opposite side of the tube unslotted, and placing said tubular member upon a curved metallic core member with said slotted side therof on th inner side of the curve whereby there is formed a flexible device free from interstices in its outer surface.

In testimony whereof, I have signed my name to this specification this 14th day of February, 1924.

ROBERT S. BLAIR.